United States Patent
Petillon

(10) Patent No.: US 6,199,613 B1
(45) Date of Patent: Mar. 13, 2001

(54) APPARATUS FOR APPLYING PADDING, ESPECIALLY ACOUSTICALLY ACTIVE PADDING

(75) Inventor: Alain Petillon, Worms (DE)

(73) Assignee: CWW-GERKO Akustik GmbH & Co. KG, Worms (DE)

( * ) Notice: Subject to any disclaimer, the term of this patent is extended or adjusted under 35 U.S.C. 154(b) by 0 days.

(21) Appl. No.: 09/271,374

(22) Filed: Mar. 18, 1999

(30) Foreign Application Priority Data

Mar. 20, 1998 (DE) .............................................. 198 12 402

(51) Int. Cl.⁷ ..................................................... B32B 31/00
(52) U.S. Cl. ........................ 156/382; 156/580; 156/583.3
(58) Field of Search ..................................... 156/381, 382, 156/356, 583.3, 580, 212, 213, 287, 94; 269/21; 264/101, 102

(56) References Cited

U.S. PATENT DOCUMENTS

| | | |
|---|---|---|
| 3,146,143 | 8/1964 | Bolesky et al. . |
| 3,149,018 | 9/1964 | Jacobson . |
| 4,740,417 * | 4/1988 | Tornero ............................ 428/308.4 |
| 4,828,637 * | 5/1989 | Mentzer et al. ..................... 156/212 |
| 5,589,026 | 12/1996 | Perecman . |

FOREIGN PATENT DOCUMENTS

| | | |
|---|---|---|
| 30 30 537 | 3/1982 | (DE) . |
| 32 29 150 | 4/1984 | (DE) . |
| 35 37 997 | 8/1988 | (DE) . |
| 43 10 302 A1 | 10/1994 | (DE) . |
| 195 05 523 | 8/1996 | (DE) . |
| 196 16 670 | 10/1997 | (DE) . |
| 0 038 922 | 11/1981 | (EP) . |
| 0 233 700 | 8/1987 | (EP) . |
| 0 339 275 | 11/1989 | (EP) . |
| 58059024 | 4/1983 | (JP) . |
| 05293895 | 11/1993 | (JP) . |
| WO 91 01873 | 2/1991 | (WO) . |

OTHER PUBLICATIONS

Grundlagen der Kunststoffverarbeitung, Darmstadt 1970, D 17, Carl Hanser Verlag Munchen 1970.
Abstract, 5–131545, Yoji Masuda, Vacuum Press Laminating Method, —1479 Sep. 13, 1993, vol. 17/No. 507, May 28, 1993.

* cited by examiner

*Primary Examiner*—Michael W. Ball
*Assistant Examiner*—John T. Haran
(74) *Attorney, Agent, or Firm*—Evenson, McKeown, Edwards & Lenahan, P.L.L.C.

(57) ABSTRACT

An apparatus for applying a pad to a component has a flexible diaphragm held in a continuous frame for holding the pad. On its front side which faces the component when the apparatus is in use, the frame has a circumferential, resilient gasket. Through a vacuum connection, a space between the diaphragm and the component is to be attached to a vacuum source. By that the pad applies itself against the component.

9 Claims, 1 Drawing Sheet

APPARATUS FOR APPLYING PADDING, ESPECIALLY ACOUSTICALLY ACTIVE PADDING

This application claims the priority of German application No. 198 12 402.3, filed Mar. 20, 1998, the disclosure of which is expressly incorporated by reference herein.

BACKGROUND AND SUMMARY OF THE INVENTION

This invention relates to an apparatus for applying padding, especially acoustically active padding, to a component, especially to car body sheet metal.

Pads serving as sound damping layers in the form of bitumen padding are adhered in motor vehicles, for example, against the underside of the vehicle's roof in order to prevent acoustical problems, such as rumbling noises in the motor vehicle. At the present time the acoustically active padding is laid onto a tool body, the latter is shifted with the pad to the correct position under the roof, and then the pad is pressed by hand against the roof through a window created in the tool body. This procedure of hand pressing is very time-consuming and in practice often results in insufficient adhesion of the pad due to insufficient pressing force, so that the pad falls back from the roof with relative frequency. Since the curvature of the vehicle's roof is established with relatively wide tolerances, it has been possible heretofore only with difficulty to automate the procedure of pressing the padding onto it, because in automatic applying devices, dimensional variances of the component to be provided with the pad lead to great differences in the pressing forces.

It is also known in practice to press acoustically active padding against the roof surface by means of a rubber pad to which pressure can be applied. This method of application, however, has the disadvantage that the roof must be given support on the side opposite the pad so that it will not be deformed. Consequently, such kinds of application of padding require relatively great cost in the manufacturing plants.

This invention is addressed to the problem of designing an apparatus of the kind described above such that padding can be applied always with the same uniform contact pressures across the padding in question, to differently curved components made with wide tolerances.

This problem is solved by the invention in that the apparatus has a flexible diaphragm set in a continuous frame for holding the padding on the diaphragm's side remote from the component, that on its front side which faces the component when the apparatus is in use the diaphragm has a circumferential, elastic gasket, and that the apparatus is provided with a vacuum connection for connecting the space between the diaphragm and the component to a vacuum source.

With such an apparatus, even a pad of large area can be applied against an irregularly shaped and less than precisely dimensioned component with a very accurate contact pressure that is uniform across the area of the padding. Since the contact pressure is created by producing a vacuum on the side of the diaphragm facing the component, the occurrence of air spaces is prevented which might result in insufficient adhesion of the padding. In general, the apparatus of the invention is of very simple construction, is of little weight and occupies little space, so that it can be used successfully even where the amount of space available is not great, and its introduction into a car body, for example, by means of a robot, is easily possible. The padding can be acoustically active padding, and also stiffening materials, thermal insulating materials and combination materials. Since the apparatus of the invention operates with a vacuum, the same pressure prevails on the side of the component remote from the padding as prevails on the side of the padding, so that no counter-pressure need be produced. The apparatus of the invention operates instead in a force-neutral manner. It is also suitable for components which have corrugations, for example, because air bubbles are prevented by the vacuum. Another advantage lies in the fact that the pads can be supplied as flat pieces and only with the apparatus of the invention can they be given a shape matching the shape of the component as they are applied.

As is common with acoustically active padding, these pads can be self-adhesive when used with the apparatus of the invention, so that a cover film must be removed before they are adhered. It is also possible, however, to use a pressure-sensitive adhesive or moisture-hardening adhesive, or in the case of a hot-melt glue it can be heated by a heating field and thus activated.

Air inclusions between the component and the film can be prevented especially reliably if, according to an advantageous embodiment of the invention, the diaphragm, when in its state of rest unaffected by the vacuum it is convexly curved toward the component. Thus it can be brought about that, upon its attachment, the pad is first brought in contact with the component in a central area and then applies itself uniformly against the component from the inside out.

It is especially advantageous if, in another embodiment of the invention, the diaphragm in the state of rest lies with its side remote from the component on a support convexly curved toward the component, and the distance from the diaphragm with the pad lying upon it to the top edge of the gasket of the frame is such that the pad does not come in contact with the central surface area of the component until the frame with its gasket is in sealing contact with the component. Such a support makes it possible to adapt to pads of different thickness by using a support with a matching thickness.

If the support consists of a resilient foam substance, the support will be able by elastic deformation to equalize any differences in the component to be provided with the pad.

The apparatus is of especially simple design and permits reliable evacuation if the frame has near its circumferential gasket an annular circumferential passage connected to the vacuum connection, and if a plurality of vacuum orifices distributed over the circumference of the frame lead into the space between the diaphragm and the component.

BRIEF DESCRIPTION OF THE DRAWINGS

These and other objects, features and advantages will become more apparent from the following detailed description of a presently preferred embodiment when taken in conjunction with the accompanying drawings wherein.

DETAILED DESCRIPTION OF THE PREFERRED EMBODIMENT

Figure 1:
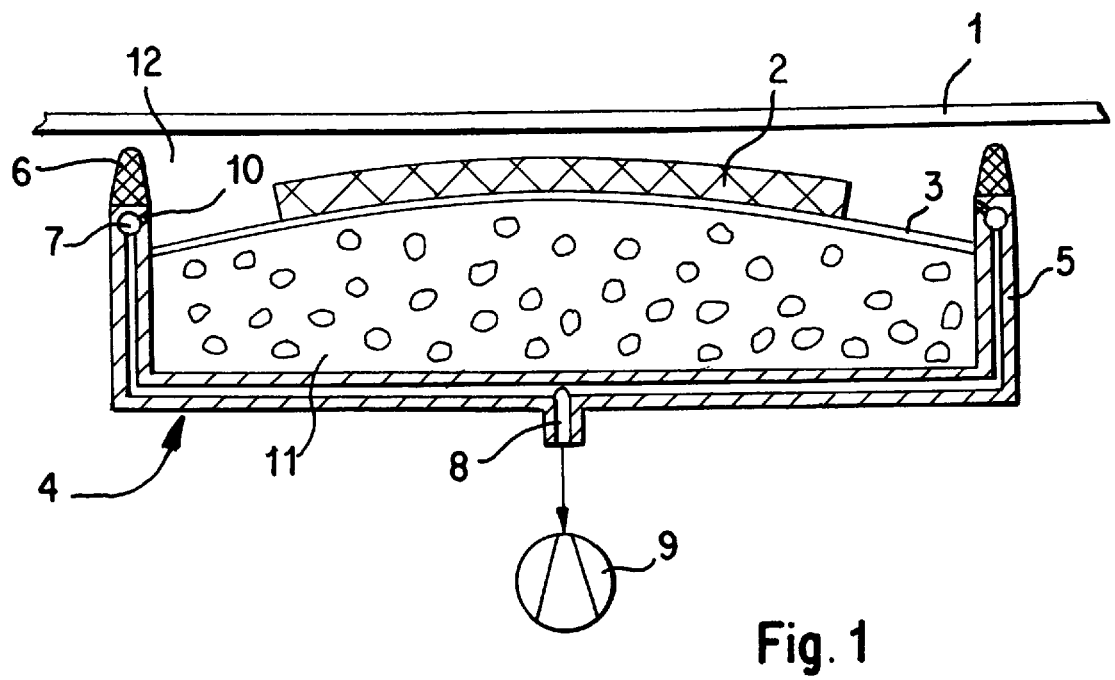
FIG. 1 is an elevational view, in cross-section through the apparatus, in a position facing a component.

FIG. 1 shows a component 1 which can be, for example, a panel of a car body. An acoustically active pad 2, a bituminous pad for example, is to be adhered against this component 1. For this purpose the pad 2 is positioned on a flexible diaphragm 3 of an apparatus 4. This diaphragm 3 is held on all sides by a frame 5 which is provided on its side facing the component with a circumferential gasket 6.

Near this gasket 6, an annular passage 7 runs in the frame 5 and leads to a vacuum connection 8. A vacuum source 9 is attached to this vacuum connection. A plurality of vacuum orifices 10 lead from the annular passage 7 to the interior of the frame 5.

Also to be seen in FIG. 1 is a support 11 made of a resilient foam material. This support 11 is convexly curved on the side facing the component 1. Against this convexly curved surface lies the diaphragm 3, so that it too is convexly curved toward the component 1.

If the apparatus 4 is moved against the component 1, the gasket 6 makes contact with the component 1. Thus a chamber 12 is shut off from the atmosphere. The pad first contacts only the central region of the component 1.

Figure 2:
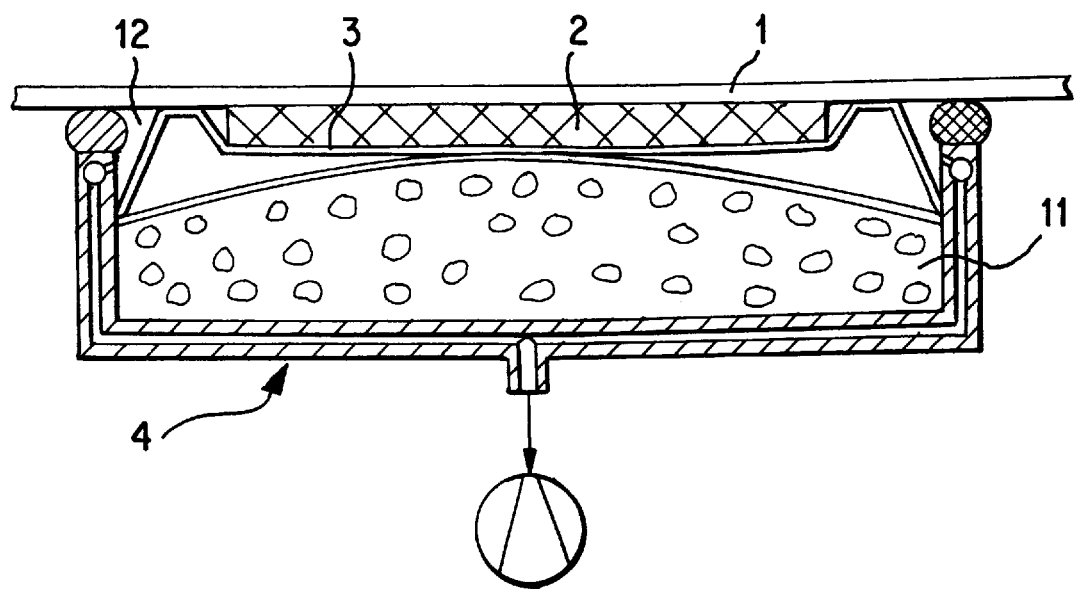
FIG. 2 is an elevational view, in cross-section corresponding to FIG. 1 with the apparatus in contact and with the component with the pad fully pressed against it.

If by means of the vacuum source 9 the chamber 12 is evacuated, then the diaphragm 3 with pad 2 presses from the opposite side against the component 1. In the end position shown in FIG. 2 the pad has been forced entirely against the component 1, while the diaphragm 3 has been deformed in a bellows-like manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for applying a pad to a component comprising a closed frame which is open at the front thereby defining an annular front edge; a flexible diaphragm attached to the frame in the vicinity of the front; a circumferential, resilient gasket on the front edge of the frame; a vacuum source; and a vacuum connection for connecting a space formed between the diaphragm and the front to the vacuum source, wherein the diaphragm is normally curved convexly toward the front when in its rest position and the diaphragm is capable of applying a pad to a component that is in contact with the gasket when vacuum is applied through the vacuum connection.

2. An apparatus according to claim 1, wherein the frame has a circumferential annular passage near its circumferential gasket leading to the vacuum connection and a plurality of vacuum orifices distributed over the circumference of the frame which lead into the space between the diaphragm and the front.

3. An apparatus according to claim 1, wherein the frame has a circumferential annular passage near its circumferential gasket leading to the vacuum connection and a plurality of vacuum orifices distributed over the circumference of the frame which lead into the space between the diaphragm and the front.

4. An apparatus according to claim 1, further comprising a support disposed within the frame and curved convexly toward the front, wherein the diaphragm lies in the rest position on the side remote from the component on the support, and the distance of the diaphragm with the pad lying thereon from the front edge of the gasket of the frame is such that the pad at first has contact with the component only in the central area when the frame is in contact with its gasket sealingly against the component.

5. An apparatus according to claim 4, wherein the frame has a circumferential annular passage near its circumferential gasket leading to the vacuum connection and a plurality of vacuum orifices distributed over the circumference of the frame which lead into the space between the diaphragm and the front.

6. An apparatus according to claim 4, wherein the support is made of a resilient foam material.

7. An apparatus according to claim 6, wherein the frame has a circumferential annular passage near its circumferential gasket leading to the vacuum connection and a plurality of vacuum orifices distributed over the circumference of the frame which lead into the space between the diaphragm and the front.

8. The combination of the apparatus of claim 1 and a component, wherein the resilient gasket is in contact with the component.

9. An apparatus according to claim 8, wherein said pad is an acoustically active pad and said component is an auto body panel.

* * * * *